Joseph A. Putt's Improved Bridle.
No. 71324
PATENTED NOV 26 1867
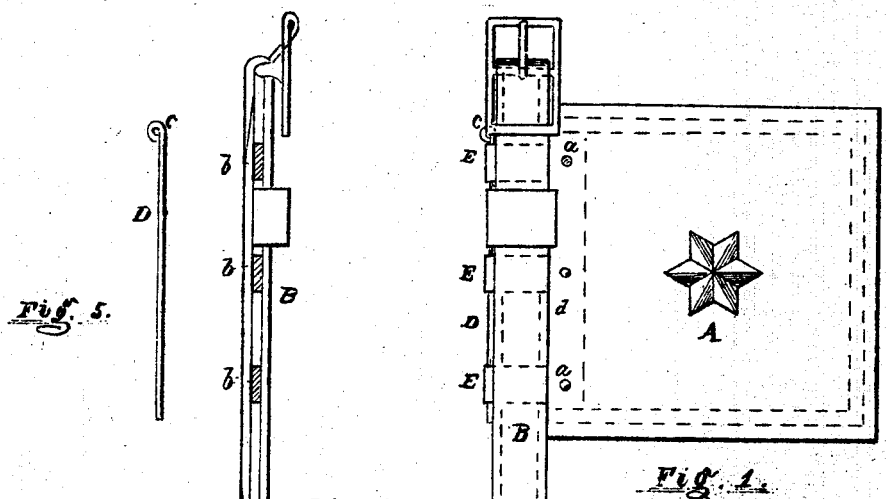
Fig. 1.
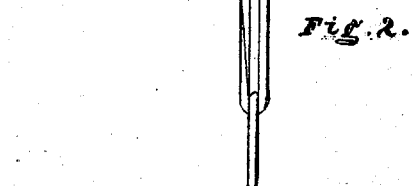
Fig. 5.    Fig. 2.
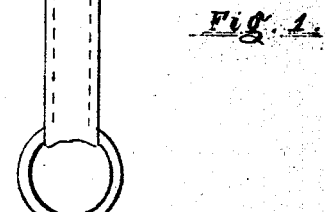
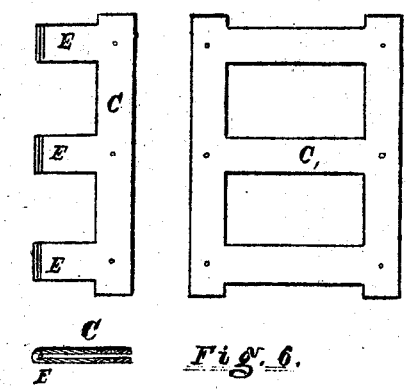
Fig. 6.
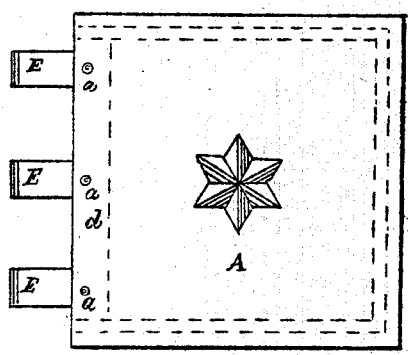
Fig. 3.
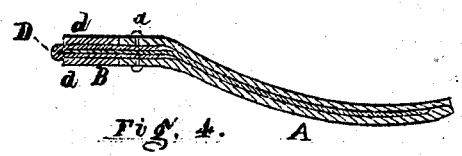
Fig. 4.
Witnesses: Ruth K. Abbott, E. W. Bubout
Inv'r Joseph A. Putt
By Job Abbott, Attorney

United States Patent Office.

JOSEPH A. PUTT, OF MARLBORO, OHIO.

Letters Patent No. 71,324, dated November 26, 1867.

IMPROVED BRIDLES.

The Schedule referred to in these Letters Patent and making part of the same.

TO ALL WHOM IT MAY CONCERN:

Be it known that I, JOSEPH A. PUTT, of Marlboro, in the county of Stark, and State of Ohio, have invented new and useful Improvements in Bridles; and I do hereby declare that the following is a full, clear, and exact description of my invention, reference being had to the accompanying drawings, forming a part of this specification, and to the letters of reference marked thereon, of which drawings—

Figure 1 is a view of the cheek-piece and blind of a bridle with my improvements.
Figure 2 is a side view of the cheek-piece with blind detached.
Figure 3 is a view of the blind with cheek-piece detached.
Figure 4 is a sectional view of the cheek-piece and blind.
Figure 5 is a view of the fastening-pin; and
Figure 6 are views of the iron which is attached to the blind.

The nature of my invention consists in so connecting the cheek-piece and blind of a bridle, as that the bridle may be readily changed from a blind-bridle to an open one, and *vice versa*, the cheek-piece remaining the same in both cases, and the change being effected by the simple removal of the blind.

To enable others skilled in the art to make and use my invention, I will proceed to describe its construction and application.

The iron, C, is formed of a flat piece of sheet iron, brass, or other suitable material, cut out in the form shown at C, in fig. 6, and bent into the form shown at C, in same figure. This iron, C, is secured between the edges of the two parts $dd$ of the ordinary blind, A, by means of the rivets $aaa$, which pass through the two pieces $dd$ of the blind, A, and the iron, C, and are riveted on the outside, as fully shown in fig. 4. In the cheek-piece B are formed the holes $bbb$, through which pass the lugs E E E of the iron, A. A pin, D, of stout wire is formed, as shown in fig. 5, and when the lugs E E E are passed through the holes $bbb$, the pin D is inserted into the ends of said lugs, as shown in fig. 1, thus securing the blind, A, and cheek-piece B together. To take off the blind, A, the pin D is pulled out of the lugs E E E by means of the head $c$, and the blind, A, is then easily slid out, as is readily seen.

What I claim as my invention, and desire to secure by Letters Patent, is—

1. The peculiar arrangement and combination of the blind, A, iron, C, cheek-piece B, and pin D, the whole being arranged in the manner and for the purpose herein specified.

2. The holes $bbb$ in the cheek-piece B when used for the purpose of obtaining an interchangeable bridle, substantially in the manner and for the purpose specified.

3. So constructing a bridle as that it may be changed from a blind to an open bridle, and *vice versa*, without changing the cheek-piece, in the manner herein described, and for the purpose herein sepecified.

As evidence that I claim the foregoing, I have hereunto set my hand in the presence of two witnesses.

JOSEPH A. PUTT.

Witnesses:
ABNER TAYLOR,
MARTIN ROGERS.